United States Patent
Itami et al.

(10) Patent No.: US 9,229,225 B2
(45) Date of Patent: Jan. 5, 2016

(54) OPTICAL SCANNING DEVICE AND IMAGE FORMING APPARATUS

(71) Applicants: Yukio Itami, Kanagawa (JP); Tadashi Nakamura, Tokyo (JP)

(72) Inventors: Yukio Itami, Kanagawa (JP); Tadashi Nakamura, Tokyo (JP)

(73) Assignee: RICOH COMPANY, LIMITED, Tokyo (JP)

(*) Notice: Subject to any disclaimer, the term of this patent is extended or adjusted under 35 U.S.C. 154(b) by 302 days.

(21) Appl. No.: 13/790,216

(22) Filed: Mar. 8, 2013

(65) Prior Publication Data
US 2013/0235143 A1 Sep. 12, 2013

(30) Foreign Application Priority Data

Mar. 8, 2012 (JP) ................................. 2012-052004

(51) Int. Cl.
*G02B 26/12* (2006.01)
*B41J 2/44* (2006.01)
*B41J 2/47* (2006.01)

(52) U.S. Cl.
CPC ............... *G02B 26/125* (2013.01); *B41J 2/442* (2013.01); *B41J 2/473* (2013.01); *G02B 26/123* (2013.01); *G02B 26/127* (2013.01)

(58) Field of Classification Search
CPC ............. G02B 26/0816; G02B 26/122; G02B 26/123; G02B 26/125; G02B 26/129; B41J 2/442; B41J 2/473
See application file for complete search history.

(56) References Cited

U.S. PATENT DOCUMENTS

| 5,069,515 | A | 12/1991 | Itami et al. |
| 5,726,699 | A | 3/1998 | Itami et al. |
| 5,739,602 | A | 4/1998 | Suzuki et al. |
| 6,580,186 | B1 | 6/2003 | Suzuki et al. |
| 2002/0130948 | A1 | 9/2002 | Itami et al. |
| 2003/0160529 | A1 | 8/2003 | Suzuki et al. |
| 2006/0061847 | A1 | 3/2006 | Itami |

(Continued)

FOREIGN PATENT DOCUMENTS

| JP | 01-282572 | 11/1989 |
| JP | 09-277594 | 10/1997 |
| JP | 11-218697 | 8/1999 |

OTHER PUBLICATIONS

U.S. Appl. No. 13/757,998, filed Feb. 4, 2013, Nakamura, et al.

(Continued)

*Primary Examiner* — Kristal Feggins
*Assistant Examiner* — Kendrick Liu
(74) *Attorney, Agent, or Firm* — Oblon, McClelland, Maier & Neustadt, L.L.P.

(57) ABSTRACT

An optical scanning device includes a plurality of scanning optical systems that focus light beams deflected by an optical deflector onto corresponding scanning surfaces. The systems include a first scanning optical system and a second scanning optical system. The first scanning optical system and the second scanning optical system are disposed respectively at each side of a plane including a rotation axis of a polygonal-mirror optical deflector. Each of the scanning optical systems includes a synchronous detection optical system that determines a timing to start scanning the scanning surfaces with the light beams. When a time from the end of an effective scanning area in the second scanning optical system to synchronous detection in the first scanning optical system is Ta, and a time from the end of an effective scanning area in the first scanning optical system to synchronous detection in the second scanning optical system is Tb, Ta>Tb.

11 Claims, 6 Drawing Sheets

(56) References Cited

U.S. PATENT DOCUMENTS

| | | | |
|---|---|---|---|
| 2006/0208179 A1* | 9/2006 | Itami | 250/234 |
| 2006/0209377 A1 | 9/2006 | Atsuumi et al. | |
| 2007/0146852 A1 | 6/2007 | Itami | |
| 2007/0153349 A1 | 7/2007 | Itami et al. | |
| 2007/0297036 A1 | 12/2007 | Nakamura et al. | |
| 2008/0055690 A1 | 3/2008 | Nakamura et al. | |
| 2008/0062491 A1 | 3/2008 | Nakamura et al. | |
| 2008/0174843 A1 | 7/2008 | Masuda et al. | |
| 2008/0192323 A1 | 8/2008 | Nakamura et al. | |
| 2008/0204539 A1 | 8/2008 | Itami et al. | |
| 2008/0204841 A1 | 8/2008 | Suzuki et al. | |
| 2008/0218827 A1* | 9/2008 | Watanabe et al. | 359/204 |
| 2008/0218829 A1 | 9/2008 | Nakamura | |
| 2008/0239432 A1 | 10/2008 | Itami | |
| 2008/0285104 A1* | 11/2008 | Arai et al. | 359/205 |
| 2009/0015897 A1 | 1/2009 | Nakamura et al. | |
| 2009/0073523 A1 | 3/2009 | Nakamura | |
| 2009/0201358 A1 | 8/2009 | Nakamura | |
| 2009/0225148 A1 | 9/2009 | Itami et al. | |
| 2009/0231659 A1 | 9/2009 | Masuda et al. | |
| 2010/0091083 A1 | 4/2010 | Itami et al. | |
| 2010/0091342 A1 | 4/2010 | Nakamura | |
| 2011/0058230 A1 | 3/2011 | Soeda et al. | |
| 2011/0110687 A1 | 5/2011 | Miyatake et al. | |
| 2012/0056968 A1 | 3/2012 | Imai et al. | |
| 2012/0177409 A1 | 7/2012 | Arai et al. | |
| 2012/0182367 A1 | 7/2012 | Masuda et al. | |
| 2012/0236380 A1 | 9/2012 | Miyatake et al. | |
| 2013/0016171 A1 | 1/2013 | Nakamura et al. | |

OTHER PUBLICATIONS

Abandoned U.S. Appl. No. 08/241,582, filed May 12, 1994, Mitsuo Suzuki, et al.

* cited by examiner

FIRST LIGHTING IS PERFORMED AFTER
PREDETERMINED DELAY TIME Td BY REFERRING TO
RISE (↑) AND FALL (↓) OF PM_FG SIGNAL.
SECOND OR LATER LIGHTING IS CONTROLLED BY
REFERRING TO XDETP SIGNAL.

FIRST LIGHTING IS PERFORMED AFTER
PREDETERMINED DELAY TIME Td BY REFERRING TO
RISE (↑) AND FALL (↓) OF PM_FG SIGNAL.
SECOND OR LATER LIGHTING IS CONTROLLED BY
REFERRING TO XDETP SIGNAL.

FIRST LIGHTING IS PERFORMED AFTER
PREDETERMINED DELAY TIME Td BY REFERRING TO
RISE (↑) AND FALL (↓) OF PM_FG SIGNAL.
SECOND OR LATER LIGHTING IS CONTROLLED BY
REFERRING TO XDETP SIGNAL.

ND IMAGE FORMING APPARATUS

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2012-052004 filed in Japan on Mar. 8, 2012.

BACKGROUND OF THE INVENTION

1. Field of the Invention

The present invention relates to an image forming apparatus, such as a digital copying machine or a laser printer, and an optical scanning device used in the image forming apparatus.

2. Description of the Related Art

There is a known image forming apparatus that scans a scanning surface by rotating a deflecting scanning means, such as a polygon mirror. As one of such image forming apparatuses, an image forming apparatus has been proposed that detects a rotation position of the deflecting scanning means, measures a time from output of a rotation position detection signal to first detection of a synchronous detection signal, stores the measured time, and after that, turns on a light source based on the stored time after the rotation position detection signal is detected (for example, see Japanese Patent Application Laid-open No. 11-218697).

Meanwhile, in a system that divides a light beam from one light source into two or more light beams and applies the light beams to opposing scanning optical systems to perform writing in a time-shared manner, an effective scanning periodic ratio is high. Therefore, a time interval from the end of an effective scanning area in one of the scanning optical systems to synchronous detection in the other one of the scanning optical systems is short. Therefore, when lighting of the light source is controlled based on the rotation position detection signal of the deflecting scanning means, unnecessary exposure may occur near the end of the scanning optical system opposite a synchronous detection section due to a position detection error of the rotation position detection signal.

The present invention has been made to solve the above problem, and an object thereof is to provide an optical scanning device and an image forming apparatus that, in a system that divides a light beam emitted by one light source into two or more light beams and applies the light beams to opposing scanning optical systems to perform writing in a time-shared manner, can prevent unnecessary exposure near the end of the scanning optical system opposing the synchronous detection section even when the rotation position detection signal of the deflecting scanning means contains a small position detection error.

Furthermore, another object of the present invention is to provide an optical scanning device and an image forming apparatus that can maximize a writable angular range as an effective scanning range and prevent an increase in the optical path length.

SUMMARY OF THE INVENTION

It is an object of the present invention to at least partially solve the problems in the conventional technology.

According to the present invention, there is provided an optical scanning device comprising: a light source; a light dividing unit configured to divide a light beam emitted by the light source; a polygonal-mirror optical deflector configured to deflect each of the light beams divided by the light dividing unit; and a plurality of scanning optical systems configured to focus the respective light beams deflected by the polygonal-mirror optical deflector onto corresponding scanning surfaces.

In the above-mentioned optical scanning device, the scanning optical systems include a first scanning optical system and a second scanning optical system, the first scanning optical system and the second scanning optical system are disposed respectively at each side of a plane including a rotation axis of the polygonal-mirror optical deflector, each of the first scanning optical system and the second scanning optical system includes a synchronous detection optical system that determines a timing to start scanning the scanning surfaces with the light beams, and Ta>Tb is satisfied, where Ta is a time from an end of an effective scanning area in the second scanning optical system to synchronous detection in the first scanning optical system and Tb is time from an end of an effective scanning area in the first scanning optical system to synchronous detection in the second scanning optical system.

The present invention also provides an image forming apparatus configured to separately form electrostatic latent images on surfaces of a plurality of photoreceptors by optical scanning, develops the electrostatic latent images to form toner images, and transfers all of the toner images on a single recording medium to synthetically form an image, the image forming apparatus comprising: the above-mentioned optical scanning device configured to form the electrostatic latent images, wherein the first scanning optical system of the optical scanning device is used for black, and the second scanning optical system of the optical scanning device is used for a color other than black.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Optical Scanning Device

An optical scanning device according to an embodiment of the present invention will be explained below.

Figure 1:
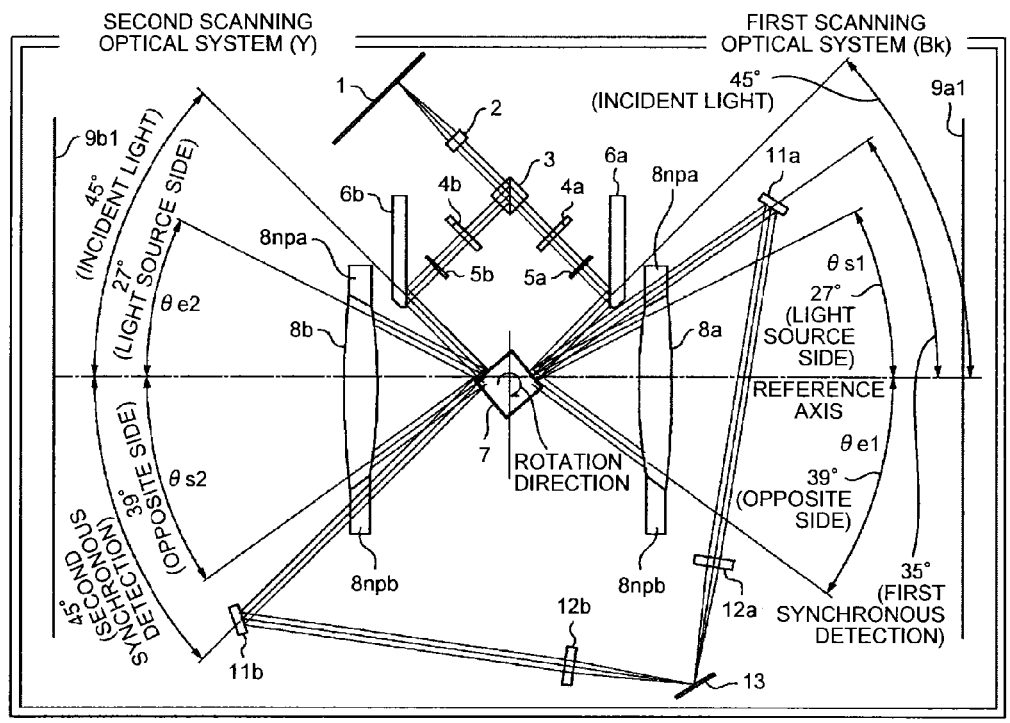
FIG. 1 is a diagram illustrating an optical layout of an optical scanning device in a cross section in the main-scanning direction according to an embodiment of the present invention.
Figure 2:
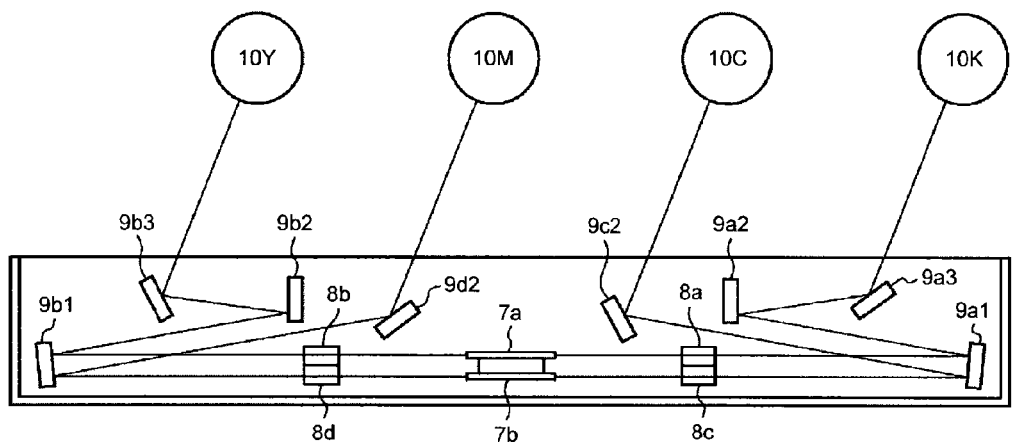
FIG. 2 is a diagram illustrating an optical layout around an optical deflector of the optical scanning device in a cross section in the sub-scanning direction.

FIG. 1 is a diagram illustrating an optical layout of the optical scanning device in a cross section in the main-scanning direction according to the embodiment of the present invention. FIG. 2 is a diagram illustrating an optical layout around an optical deflector of the optical scanning device in a cross section in the sub-scanning direction. The optical scanning device forms toner images of a plurality of colors of yellow (Y), magenta (M), cyan (C), and black (K) on photoreceptors (image carriers) corresponding to the respective colors.

A reference numeral 1 denotes a light source device (LD) with a 4-channel multibeam semiconductor laser. A reference numeral 7 denotes the optical deflector that deflects light beams (light fluxes) emitted by an LD 1 for scanning. A reference numeral 2 denotes a coupling lens that guides the light beams emitted by the LD 1 to the optical deflector 7. A reference numeral 3 denotes a half mirror cube serving as a dividing element. A reference numeral 4 (4a, 4b) denotes cylindrical lenses serving as linear-image imaging optical systems. A reference numeral 5 (5a, 5b) denotes apertures that regulate beam widths of the light beams. A reference numeral 6 (6a, 6b) denotes incidence mirrors that change optical paths of the light beams.

A reference numeral 10 (10Y, 10M, 10C, 10K) denotes photoconductive photoreceptors each having a photosensitive layer formed on the surface thereof. Each of the photoreceptors 10 is rotated in the same direction (for example, counterclockwise in FIG. 2) about a rotation axis by a rotating mechanism (not illustrated). The axial directions of the rotation axes of all of the photoreceptors 10 (a direction normal to the sheet of FIG. 2) are parallel to one another. The diameters of all of the photoreceptors 10 are the same.

A reference numeral 8 (8a, 8b, 8c, 8d) denotes scanning lenses that focus the light beams deflected by the optical deflector 7 onto the surfaces of the photoreceptors 10 serving as scanning surfaces. A reference numeral 9 (9a1, 9a2, 9a3; 9b1, 9b2, 9b3; 9c2; 9d2) denotes reflecting mirrors for reflecting the light beams that have passed through the scanning lenses 8. Cover glasses (not illustrated), through which the light beams reflected by the reflecting mirrors 9 pass, are provided in the optical paths between the reflecting mirrors 9 and the photoreceptors 10.

The optical deflector 7 is a polygonal-mirror optical deflector, such as a polygon mirror, having a plurality of deflecting reflecting surfaces. A driving mechanism (not illustrated) rotates the optical deflector 7 clockwise (in the arrow direction in FIG. 1) about a rotation axis at a constant angular velocity. Detailed configurations of the optical deflector 7 will be explained later.

In the following explanation, a direction in which the light beams emitted by the LD 1 are deflected for scanning by the optical deflector 7 is described as a main-scanning direction, and a direction perpendicular to the main-scanning direction is described as a sub-scanning direction.

The optical scanning device divides each of the light beams emitted by two light source devices into two light beams in the cross section in the main-scanning direction, and scans the surfaces of the four photoreceptors 10 corresponding to the respective colors (Y, M, C, K) with the light beams. Specifically, the optical scanning device includes four scanning optical systems corresponding to the respective colors.

In FIG. 1, a first scanning optical system for black and a second scanning optical system for yellow are illustrated from among the four scanning optical systems (image forming stations), and illustrations of a scanning optical system for cyan and a scanning optical system for magenta are omitted.

The first scanning optical system and the second scanning optical system are disposed respectively at each side of a plane including the rotation axis of the optical deflector 7 so as to be opposite each other in the cross section in the main-scanning direction. Similarly, although not illustrated in FIG. 1, the scanning optical system for cyan and the scanning optical system for magenta are disposed on both sides of the rotation axis of the optical deflector 7 so as to be opposite each other in the cross section in the main-scanning direction.

The LD 1 is a light source device with a 4-channel multi-beam semiconductor laser. However, for simplicity of illustration, four light beams emitted by the LD 1 are indicated by one optical path in the drawings.

Diverging light beams emitted by the LD 1 are coupled into beams in a beam form appropriate for an optical system subsequent to the coupling lens 2. All of the coupled light beams have the same beam form, so that the light beams can become "parallel beams" or "converging or diverging beams". Each of the light beams that have passed through the coupling lens 2 is divided into two beams, that is, a transmitted light and a reflected light, in the cross section in the main-scanning direction due to the action of the half mirror cube 3. The optical paths of the divided light beams differ by 90°. Of the two light beams, the transmitted light is used as a light beam for the first scanning optical system (a light flux 1a: see FIG. 3) and the reflected light is used as a light beam for the second scanning optical system (a light flux 1b: see FIG. 3).

Each of the two light beams divided by the half mirror cube 3 is focused in the sub-scanning direction due to the action of the cylindrical lens 4 (4a or 4b), passes through an opening of the aperture 5 (5a or 5b) so that the width of the light flux can be regulated for beam shaping, and is incident on the incidence mirror 6 (6a or 6b). The optical path of the light beam incident on the incidence mirror 6 (6a or 6b) is deflected by 90°, and a long linear image along the main-scanning direction is formed near the deflecting reflecting surface of the optical deflector 7.

The optical deflector 7 deflects two light beams (light fluxes 1a and 1b) coming from the incidence mirrors 6 at a constant angular velocity. As will be described later, the optical deflector 7 is structured such that two rotary polygon mirrors 7a and 7b (see FIG. 2), each having the same shape and each having four deflecting reflecting surfaces, are overlaid in the sub-scanning direction. The light beam (the light flux 1a) of the first scanning optical system and the light beam (the light flux 1b) of the second scanning optical system are incident on different deflecting reflecting surfaces among the four deflecting reflecting surfaces of the rotary polygon mirror 7a.

In the first scanning optical system, as illustrated in FIG. 2, the light beam (the light flux 1a) emitted by the LD 1 and deflected by the rotary polygon mirror 7a of the optical deflector 7 passes through the scanning lens 8a, is reflected by the reflecting mirrors 9a1, 9a2, and 9a3 so as to be incident on the photoreceptor 10K, and is focused, as a beam spot, on the surface of the photoreceptor 10K. The scanning surface is optically scanned with the focused beam spot along with rotation of the optical deflector 7. The size of the beam spot is determined by the aperture 5a.

In the second scanning optical system, as illustrated in FIG. 2, the light beam (the light flux 1b) emitted by the LD 1 and deflected by the rotary polygon mirror 7a of the optical deflector 7 passes through the scanning lens 8b, is reflected by the reflecting mirrors 9b1, 9b2, and 9b3 so as to be incident on the photoreceptor 10Y, and is focused, as a beam spot, on the surface of the photoreceptor 10Y. The scanning surface is optically scanned with the focused beam spot along with rotation of the optical deflector 7. The size of the beam spot is determined by the aperture 5b.

In the scanning optical system for cyan, although not illustrated in FIG. 1, the light beam emitted by the light source device (not illustrated in FIG. 1) and deflected by the rotary polygon mirror 7b of the optical deflector 7 passes through the scanning lens 8c, is reflected by the reflecting mirrors 9a1 and 9c2 so as to be incident on the photoreceptor 10C, and is focused, as a beam spot, on the surface of the photoreceptor 100 as illustrated in FIG. 2. The scanning surface is optically scanned with the focused beam spot along with rotation of the optical deflector 7.

In the scanning optical system for magenta, although not illustrated in FIG. 1, the light beam emitted by the light source device (not illustrated in FIG. 1) and deflected by the rotary polygon mirror 7b of the optical deflector passes through the scanning lens 8d, is reflected by the reflecting mirrors 9b1 and 9d2 so as to be incident on the photoreceptor 10M, and is focused, as a beam spot, on the surface of the photoreceptor 10M as illustrated in FIG. 2. The scanning surface is optically scanned with the focused beam spot along with rotation of the optical deflector 7.

In this way, the scanning lens 8a and the reflecting mirrors 9a1, 9a2, and 9a3 constitute a scanning imaging optical system for black that guides the four light beams emitted by the LD 1 to the photoreceptor 10K and forms four beam spots separated in the sub-scanning direction.

The scanning lens 8b and the reflecting mirrors 9b1, 9b2, and 9b3 constitute a scanning imaging optical system for yellow that guides the four light beams emitted by the LD 1 to the surface of the photoreceptor 10Y and forms four beam spots separated in the sub-scanning direction.

The scanning lens 8c and the reflecting mirrors 9a1 and 9c2 constitute a scanning imaging optical system for cyan that guides the four light beams emitted by the light source device (not illustrated in FIG. 1) to the surface of the photoreceptor 100 and forms four beam spots separated in the sub-scanning direction.

The scanning lens 8d and the reflecting mirrors 9b1 and 9d2 constitute a scanning imaging optical system for magenta that guides the four light beams emitted by the light source device (not illustrated in FIG. 1) to the surface of the photoreceptor 10M and forms four beam spots separated in the sub-scanning direction.

While the first scanning optical system for black optically scans the surface of the photoreceptor 10K, the second scanning optical system for yellow does not optically scan the surface of the photoreceptor 10Y (does not guide the light beams to the photoreceptor 10Y). Namely, the photoreceptors 10K and 10Y are optically scanned "in a temporally alternating manner". Therefore, the optical scanning device modulates the light intensity of the LD 1 by "an image signal of a black image" while the photoreceptor 10K is optically scanned, and modulates the light intensity of the LD 1 by "an image signal of a yellow image" while the photoreceptor 10Y is optically scanned. By this modulation, the optical scanning device can write an electrostatic latent image of a black image onto the photoreceptor 10K and write an electrostatic latent image of a yellow image onto the photoreceptor 10Y.

With regard to the scanning optical system for cyan and the scanning optical system for magenta, the optical scanning device employs the same method to modulate the light intensities of the light sources as those employed in the scanning optical system for black and the scanning optical system for yellow. Therefore, the optical scanning device can write an electrostatic latent image of a cyan image onto the photoreceptor 100 and write an electrostatic latent image of a magenta image onto the photoreceptor 10M.

In this way, the optical scanning device includes two light source devices each emitting four light beams, and divides each of the light beams emitted by each of the light source devices into two light beams so as to form four beam spots on each surface of the four photoreceptors for the respective colors, thereby being able to write electrostatic latent images of the respective colors onto the photoreceptors.

Scanning Optical System

As described above, the two light beams divided by the half mirror cube 3 in the cross section in the main-scanning direction are incident on different deflecting reflecting surfaces of the rotary polygon mirror of the optical deflector 7 by the incidence mirrors 6 (6a and 6b), and are deflected for scanning by scanning optical systems disposed on both sides of the rotation axis of the optical deflector 7.

The incidence mirrors 6 are disposed so that the reflected light beams can be incident on the optical deflector 7 (the deflecting reflecting surfaces of the rotary polygon mirror) at an angle of 45° with respect to the reference axis.

The reference axis is an axis defined for convenience of explanation. Specifically, the reference axis is an axis that goes along a direction perpendicular to the axial directions of the rotation axes (the horizontal direction in FIG. 1) of the photoreceptors 10 to be optically scanned by the optical scanning device, and that passes the rotation axis of the optical deflector 7.

Each of the scanning optical systems includes a synchronous detection optical system that determines a timing to write the light beam on the scanning surface. The synchronous detection optical systems include reflecting mirrors 11a and 11b serving as optical-path changing elements that change the optical paths of the light beams reflected by the optical deflector 7, and include imaging elements 12a and 12b, respectively. The optical paths are formed such that the light beams are incident on a single synchronous detecting element 13.

Of the two scanning optical systems, the scanning optical system disposed on a side (the right side in FIG. 1), where a rotation angle of the optical deflector 7 in the forward rotation direction is smaller with respect to the arrangement position of the LD 1, serves as the first scanning optical system, and the scanning optical system disposed on the other side (the left side in FIG. 1) where the rotation angle is greater serves as a second scanning optical system. The synchronous detection optical system of the first scanning optical system is referred to as a first synchronous detection optical system, and the synchronous detection optical system of the second scanning optical system is referred to as a second synchronous detection optical system.

As illustrated in FIG. 1, in the cross section of the scanning optical system in the main-scanning direction, a scanning start angle θs1 corresponding to a scanning start point in a scanning area of the first scanning optical system is about 27° with respect to the reference axis, and a scanning end angle θe1 corresponding to a scanning end point is about 39° with respect to the reference axis.

Furthermore, a scanning start angle θs2 corresponding to a scanning start point of a scanning area of the second scanning optical system is about 39° with respect to the reference axis, and a scanning end angle θe2 corresponding to a scanning end point is about 27° with respect to the reference axis.

Namely, the following relationships are established among θs1, θe1, θs2, and θe2.

θs1=θe2

θe1=θs2

θs1<θe1

In an effective scanning area of the first scanning optical system, an area corresponding to a first half of the scanning on the LD 1 side (θs1: 27°) is smaller than an area corresponding to a second half of the scanning on the opposite side of the LD 1 across the reference axis (θe1: 39°). Similarly, in an effective scanning area of the second scanning optical system, an area corresponding to a second half of the scanning on the LD 1 side (θe2: 27°) is smaller than an area corresponding to a first half of the scanning on the opposite side of the LD 1 across the reference axis (θs2: 39°).

In this way, in each of the first scanning optical system and the second scanning optical system, the size of the effective scanning area is asymmetric with respect to the reference axis such that the light source side becomes smaller.

The reflecting mirror 11a of the first synchronous detection optical system is disposed at a position at an angle of 35°, which is between the angle of 45° at which the light beam is incident on the optical deflector 7 from the incidence mirror 6a and the angle of 27° at which the light beam is applied at a start position in the effective scanning area, with respect to the reference axis.

The reflecting mirror 11b of the second synchronous detection optical system is disposed at a position at an angle of 45° with respect to the reference axis on the side opposite to the LD 1 across the reference axis.

The reflecting mirrors 11a and 11 are disposed on the respective optical paths following the scanning lenses 8a and 8b that are the imaging elements closest to the optical deflector 7.

At end portions of the scanning lenses 8 (8a and 8b), no-power sections 8npa and 8npb, which are simple transmissive sections that do not cause light convergence or light divergence, are provided to transmit light beams for synchronization. The no-power sections 8npa and 8npb have different thicknesses in the reference axis direction and different curvatures in the sub-scanning direction compared to those of other sections of the scanning lenses 8 (a section excluding the no-power section 8npa and 8npb in the scanning lens 8a and a section excluding the no-power section 8npa and 8npb in the scanning lens 8b).

In FIG. 1, the width of the flux of the light beams deflected and reflected by the optical deflector 7 for scanning is about 4 mm. Meanwhile, the effective scanning ranges of the scanning lenses 8 and the no-power sections 8npa and 8npb are set so as to be separated by 2 mm to 3 mm at the boundaries on the incidence planes of the scanning lenses 8. This is to prevent a light beam for synchronization and a light beam for scanning from overlapping each other due to a variation in components of the scanning lenses.

In this way, the light beam for synchronization is caused to pass through the no-power sections 8npa and 8npb that are integrated with the scanning lenses through which the light beam for scanning passes. Therefore, it is possible to minimize a buildup error at a separation portion where the light beam for synchronization and the light beam for scanning are separated, enabling to ensure a greater angle of view for scanning.

Furthermore, by setting different thicknesses for the no-power sections 8npa and 8npb in the reference axis direction and the sections (scanning sections) other than the no-power sections of the scanning lenses 8, it is possible to reduce the sizes of the scanning lenses 8 including the no-power sections in the main-scanning direction.

Moreover, the curvatures of the scanning lenses 8 in the sub-scanning direction are varied along the main-scanning direction within the whole effective scanning area in order to maintain good optical property in the sub-scanning direction. When the scanning lenses 8 are formed so as to be asymmetric in the main-scanning direction, it becomes possible to easily form the scanning lenses 8 by setting different curvatures of the no-power sections in the sub-scanning direction compared to the curvatures of the boundary portions between the no-power sections and the scanning sections in the sub-scanning direction.

Figure 3:
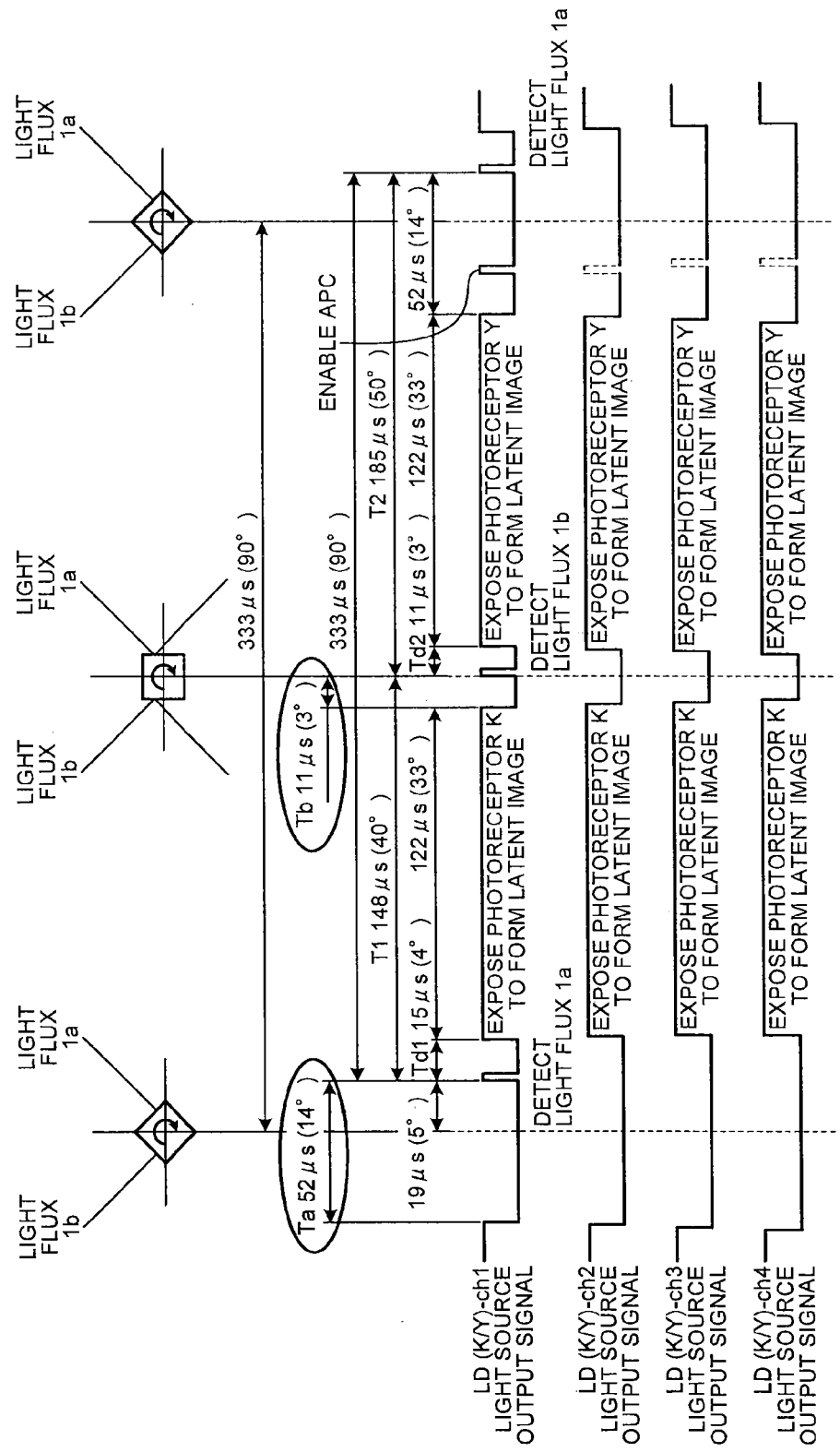
FIG. 3 is a timing diagram illustrating a timing to detect a light beam by a synchronous detection optical system of the optical scanning device.

FIG. 3 is a timing diagram illustrating a case that the optical deflector 7 illustrated in FIG. 1 is rotated at 45,000 rotations per minute. Specifically, a timing from detection of a light beam by the first synchronous detection optical system to re-detection of a light beam by the first synchronous detection optical system after rotation by one surface of the rotary polygon mirror having four surfaces, that is, rotation by 90°.

The LD 1 is a 4-channel LD array as described above. Regarding the synchronous detection, timings of a light source output signal LD(K/Y)-ch1 and a PD synchronous detection signal of the synchronous detecting element 13 are illustrated.

In FIG. 3, a rotation time of the rotation by one surface of the rotary polygon mirror having four surfaces, i.e., the rotation by 90°, is 333 μs.

A time T1 from detection by the first synchronous detection optical system to detection by the second synchronous detection optical system is about 148 μs, and a rotation angle of the rotary polygon mirror is 40°, which is 44.4% of the rotation angle of 90° corresponding to the rotation by one surface.

A time T2 from detection by the second synchronous detection optical system to detection by the first synchronous detection optical system is about 185 μs, and the rotation angle of the rotary polygon mirror is 50°, which is 55.6% of the rotation angle of 90° corresponding to the rotation by one surface.

A time Td1 from detection by the first synchronous detection optical system to a write start position of the first scanning optical system is 15 μs, and the rotation angle of the rotary polygon mirror is 4°, which is 4.4% of the rotation angle of 90° corresponding to the rotation by one surface.

A time Td2 from detection by the second synchronous detection optical system to a write start position of the second scanning optical system is 11 μs, and the rotation angle of the rotary polygon mirror is 3°, which is 3.3% of the rotation angle of 90° corresponding to the rotation by one surface.

The reflecting mirrors 11a and 11b are disposed such that T1<T2 and Td1>Td2.

A time for one sweep of scanning to form an image by each of the scanning optical systems is 122 μs, and the rotation angle of the rotary polygon mirror is 33°, which is 36.7% of the rotation angle of 90° corresponding to the rotation by one surface. An angle at which an image is formed by scanning with the light beam is 66°, which is twice as large as the rotation angle of 33°. During the rotation by 90° corresponding to the rotation by one surface of the polygon mirror, the first scanning optical system and the second scanning optical system are alternately scanned, so that 73.4%, which is twice of 36.7%, is used for image formation.

In a system that does not divide a light beam emitted by the light source, the rate of utilization for image formation is 60% to 70%. On the other hand, in the system that divides a light beam emitted by the light source as in the embodiment of the present invention, the rate of an angle (time) of an image formation area with respect to the rotation angle (rotation time) for one surface is large, so that a non-image area is reduced.

A time Ta from the end of the effective scanning area in the second scanning optical system to synchronous detection in the first scanning optical system is about 52 μs, and the rotation angle of the rotary polygon mirror is about 14°, which is 15.6% of the rotation angle of 90° corresponding to the rotation by one surface.

On the other hand, a time Tb from the end of the effective scanning area in the first scanning optical system to synchronous detection in the second scanning optical system is about 11 μs, and the rotation angle of the rotary polygon mirror is about 3°, which is about 3.3% of the rotation angle of 90° corresponding to the rotation by one surface.

Namely, Ta>Tb.

As described above, in each of the first scanning optical system and the second scanning optical system, the size of the effective scanning area is asymmetric with respect to the reference axis such that the effective scanning area on the light source side becomes smaller. Therefore, it is possible to increase the rate of Ta with respect to the rotation angle of 90°.

By setting such that T1≠T2, it becomes possible to distinguish between the synchronous detection signals of the first scanning optical system and the second scanning optical system. Therefore, the synchronous detecting elements can be integrated into a single element. Furthermore, when Ta>Tb, and if T1<T2, the angle of view for scanning can be increased.

If T1>T2, the layout is such that the angles of view θe1 and θs2 on the side opposite the light source across the reference axis (the opposite side of the light source) are reduced, so that the rate of angle used for image formation is reduced. In this case, the optical paths to the photoreceptors serving as the scanning surfaces increase, so that the layout performance decreases.

The light intensity of the light source is controlled (APC: automatic power control) between the end of the effective scanning area in the second scanning optical system to the synchronous detection by the first scanning optical system. By controlling the light intensity during the above period, it becomes possible to minimize Tb and maximize the angle of view for scanning.

If the light intensity is controlled during the time Tb, the layout is such that the angles of view θe1 and θs2 on the opposite side of the light source are reduced, so that the rate of angle used for image formation is reduced.

The necessity to make the rate of Ta greater will be explained below.

In the optical scanning device, it is necessary to perform initialization operation, such as adjustment of the emission intensity of the LD on the scanning surface. In some cases, undesired exposure may be performed depending on a timing to start the initialization operation. In particular, in a system that causes two scanning optical systems to scan different scanning surfaces by using a dividing element as in the embodiment of the present invention, photoreceptors that enter a sleep mode during a monochrome operation mode may be exposed although the exposure is not needed. Therefore, the photoreceptors may be deteriorated due to light-induced fatigue. This is a problem specific to the system that divides a light beam to scan different photoreceptors in a time-shared manner. In a system that includes light sources dedicated to respective scanning optical systems, there is no possibility to expose the photoreceptors of the other optical systems; therefore, the above problem can hardly occur.

To solve the above problem, in the optical scanning device according to the embodiment, a mirror rotation position of the rotary polygon mirror is detected, and a first lighting timing to initialize the LD is controlled by using a rotation position detection signal as a reference signal.

To use the rotation position signal as the reference signal, the wavenumber for one rotation needs to be equal to a divisor of the number of the surfaces of the rotary polygon mirror. If the number of mirror surfaces of the rotary polygon mirror is denoted by N, and the number of magnetic poles of a driving magnet of the optical deflector 7 serving as a motor is denoted by 2M, M needs to be a divisor of N.

For example, when the number of mirror surfaces of the rotary polygon mirror is four, M is 4, 2, or 1 and the number of magnetic poles is 8, 4, or 2.

For another example, when the number of mirror surfaces of the rotary polygon mirror is six, M is 6, 3, 2, or 1 and the number of magnetic poles is 12, 6, 4, or 2.

With use of a wave-shaping signal of the Hall element as the reference signal, if the LD is controlled so as to be turned on at a timing slightly earlier than a timing at which the rotation position of the rotary polygon mirror reaches a position where a light beam enters the synchronous detection element, it is possible to prevent unnecessary exposure at the initial lighting of the LD.

However, the wave-shaping signal of the Hall element contains a periodic error due to a magnetization pitch error of the driving magnet or eccentricity caused by assembly. The periodic error is usually 5% to 6% and about 10% when it is large with respect to one period.

To prevent unnecessary exposure by taking the error into account, it is necessary to configure at least such that Ta>Tb in FIG. 2. It is also necessary to ensure the rate of Ta of 5% to 6% or greater, or more preferably, 10% or greater, with respect to the rotation time corresponding to the rotation of the polygon mirror by one surface.

Therefore, as illustrated in FIG. 1, the angle of view for scanning on the light source side is made smaller than the angle of view for scanning on the opposite side of the light source. The shapes of the optical surfaces of the scanning lenses in the main-scanning direction are asymmetric with respect to the centers of the outer shapes in the main-scanning direction.

If a relationship between a magnetization position of the driving magnet and an assembly position of the polygon mirror is not defined, a phase difference between the wave-shaping signal of the Hall element and the synchronous detection signal is examined for each unit when the optical scanning device is assembled, and a specific lighting timing is stored.

In this case, when the rotator is assembled, it is necessary to assemble the driving magnet at a position at which the phase difference between the wave-shaping signal of the Hall element and the synchronous detection signal does not approach zero.

If the phase difference becomes zero, it is impossible to set an appropriate light timing because the phase difference at the time of examination becomes zero or is measured based on a time corresponding to one mirror surface.

In the initialization operation of the LD, a stored lighting timing is called to control the first lighting. After the first synchronous detection is completed, if the LD is controlled so as to be turned on at predetermined time intervals in accordance with the rotation speed of the optical deflector 7 that rotates at a constant speed, it is possible to prevent unnecessary exposure.

Figure 4:
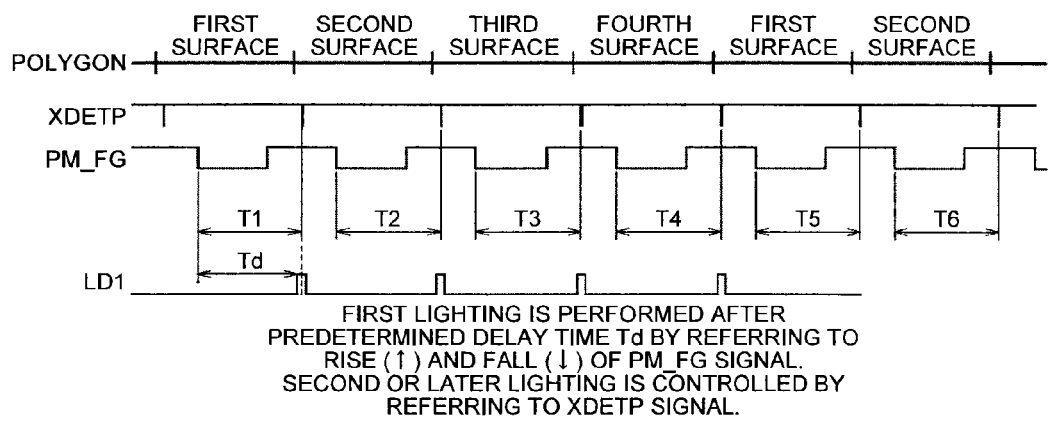
FIG. 4 is a timing diagram illustrating a Hall element of the synchronous detection optical system, a synchronous detection signal, and a lighting timing to turn on a light source of the optical scanning device (in the case of an 8-pole motor)

FIG. 4 is a timing diagram illustrating a case that an 8-pole motor is used. PM_FG indicates the wave-shaping signal of the Hall element and XDETP indicates the synchronous detection signal.

While the rotary polygon mirror rotates one turn in order of the first surface, the second surface, the third surface, and the fourth surface of the polygon mirror, waves appear four times in PM_FG. In the examination at the time of assembly, times T1, T2, T3, . . . from the fall (↓) of PM_FG to the fall of XDETP are measured, a time obtained by subtracting a periodic variation in PM_FG from the average or minimum of the measured times is regarded as a predetermined delay time Td, and the delay time is stored in a storage device.

At the time of lighting, Td is called to control the lighting timing of the LD. The PM_FG signal is referred to only the first time the lighting is controlled. After the synchronization of XDETP is detected, the PM_FG signal is not referred to and the lighting is performed at predetermined intervals with reference to the XDETP signal, so that lighting near the synchronous detection position becomes possible.

Figure 5:
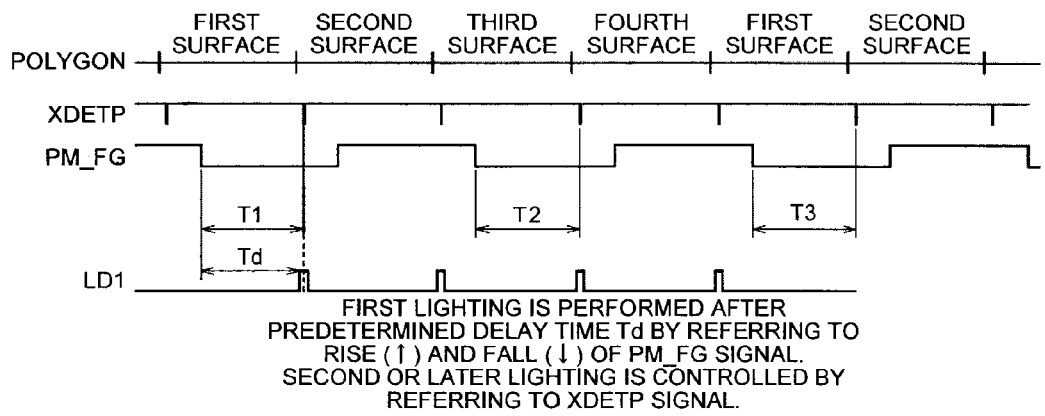
FIG. 5 is a timing diagram illustrating the Hall element of the synchronous detection optical system, the synchronous detection signal, and a lighting timing to turn on the light source of the optical scanning device (in the case of a 4-pole motor)
Figure 6:
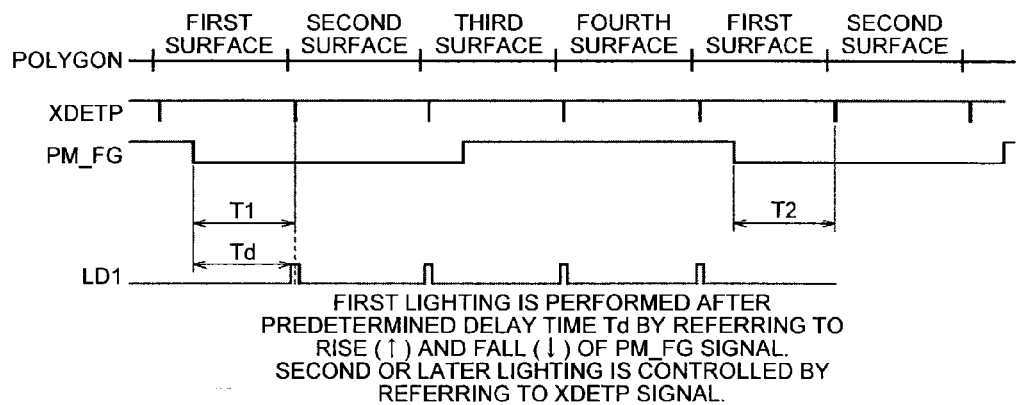
FIG. 6 is a timing diagram illustrating the Hall element of the synchronous detection optical system, the synchronous detection signal, and a lighting timing to turn on the light source of the optical scanning device (in the case of a 2-pole motor)

FIG. 5 and FIG. 6 are timing diagrams of the wave-shaping signal of the Hall element and the synchronous detection signal when a 4-pole motor and a 2-pole motor are used.

The present invention is not limited to a rotary polygon mirror having four surfaces, but may be applied to a rotary polygon mirror having six surfaces. However, in the case of the four surfaces, it is easy to obtain a relationship of Ta>Tb because a mirror is disposed at a position before a light beam enters the rotary polygon mirror, which is preferable.

In the embodiment explained above, a 4-channel multibeam semiconductor laser is employed as the light source device. However, in the present invention, the light source is not limited to the 4-channel multibeam semiconductor laser. For example, it may be possible to employ a 2-channel or 8-channel multibeam semiconductor laser or a VCSEL that is a surface emitting type capable of emitting a large number of beams.

Optical Deflector

The structure of the optical deflector 7 will be explained below.

Figure 7:
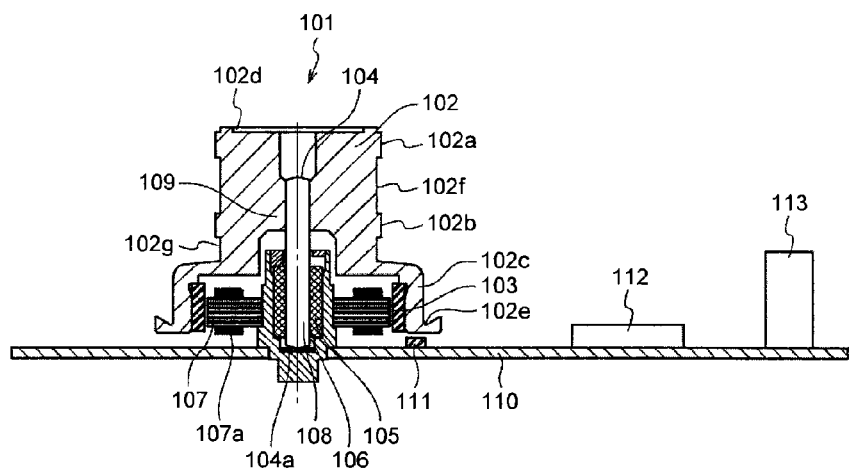
FIG. 7 is a cross-sectional view illustrating a configuration of a rotator of the optical deflector of the optical scanning device in the sub-scanning direction.

FIG. 7 is a cross-sectional view of the optical deflector 7 in the sub-scanning direction. A rotator 101 of the optical deflector 7 includes polygon mirrors 102a and 102b (corresponding to 7a and 7b in FIG. 1) and includes a flange 102c that supports a rotor magnet 103. The rotator 101 is shrink-fitted to the outer periphery of a shaft 104 of the optical deflector 7.

A shaft bearing member 105 is an oil-impregnated dynamic-pressure bearing, and a bearing clearance with respect to the diameter is set to 10 μm or smaller. A radial bearing for ensuring the stability in high-speed rotation is provided with a dynamic-pressure generation groove (not illustrated). The dynamic-pressure generation groove is provided on the outer periphery of the shaft 104 or the inner periphery of the shaft bearing member 105. However, it is preferable to provide the dynamic-pressure generation groove on the inner circumference of the shaft 104 that is made of a sintered member having good workability. As a material of the shaft 104, martensitic stainless steel (for example, SUS420J2) is preferable because it can be sintered, can increase the surface hardness, and has good abrasion resistance.

The rotor magnet 103 is fixed to a lower inner surface of the flange 102c, and forms an outer-rotor-type brushless motor together with a stator core 107 (a winding coil 107a) fixed to a housing 106. The rotor magnet 103 is a bond magnet using resin as a binder. The outer diameter portion of the rotor magnet 103 is supported by the flange 102c in order to prevent breakage due to a centrifugal force caused by high-speed rotation.

A bearing in the thrust direction is a pivot bearing that brings thrust bearing 108 into contact with a convex curve surface 104a formed on a lower end surface of the shaft 104 and an opposing surface of the convex curve surface 104a. The thrust bearing 108 is formed by performing a hardening treatment, such as a DLC (diamond like carbon) treatment, on a martensitic stainless steel, ceramics, or a surface of a metallic member, or by using a resin material or the like in order to improve the lubricity and prevent generation of abrasion powder.

The shaft bearing member 105 and the thrust bearing 108 are housed in the housing 106, and a seal member 109 prevents oil leakage.

When the rotator 101 is rotated at high speed of 25,000 rpm or faster, it is necessary to adjust and maintain a balance of the rotator 101 with high precision in order to reduce oscillation. The rotator 101 is provided with unbalance correcting portions at two positions, one of which is in the upper side and the other of which is in the lower side. Adhesive agents are applied to a top circumferential recess 102d of the rotator 101 in the upper side and to a circumferential recess 102e of the flange 102c in the lower side to correct the balance. The amount of unbalance needs to be 10 mg·mm or smaller, and, for example, the amount of correction is maintained at 1 mg or smaller in a portion with a radius of 10 mm.

If it is difficult to manage a minimal correction by an attached matter, such as an adhesive agent, as described above, or if the adhesive force is weak because of the small amount of the attached matter, such as the adhesive agent, components may be flaked off or scattered with the rotation at a high speed of 40,000 rpm or faster. In this case, it is preferable to apply a method to remove a part of the components of the rotator (by drill cutting or laser machining).

The motor system according to the embodiment is what is called an outer rotor system, in which a magnetic gap is provided in a radial direction and the rotor magnet 103 is provided on the outer diameter portion of the stator core 107. As a rotation drive, a driving IC 112 switches the excitation of the winding coil 107a to enable the rotation by referring to a signal that a Hall element 111 mounted on a circuit substrate 110 outputs due to the magnetic field of the rotor magnet 103.

The rotor magnet 103 is magnetized in the radial direction, and rotates by generating a rotational torque with the outer circumference of the stator core 107. A magnetic path of the rotor magnet 103 in the outer diameter direction and the height direction except for the inner diameter direction is open, and the Hall element 111 for switching the excitation of the motor is disposed in the open magnetic path. A harness (not illustrated) is connected to a connector 113 to supply power, to input a motor activation-deactivation signal, to input a reference clock signal to give an instruction on the rotation frequency, to output a synchronous signal to control a PLL speed, and to output a wave-shaping signal (PM_FG signal) of the Hall element that is the position detecting element.

Figure 8:
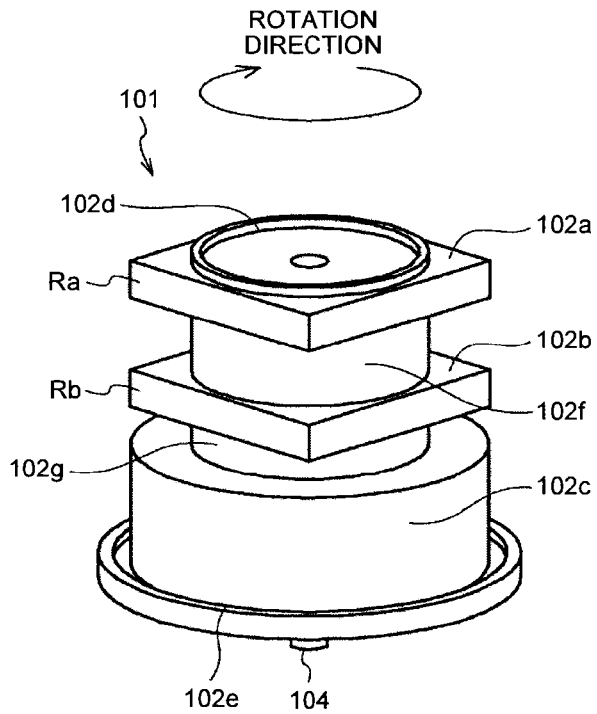
FIG. 8 is a perspective view of the rotator of the optical deflector.

FIG. 8 is a perspective view of the rotator 101. The polygon mirrors 102a and 102b are formed so as to be continuous via a connecting portion 102f. A connecting portion 102g is provided between the lower polygon mirror 102b and the flange so that the motor section can be integrated. The polygon mirrors 102a and 102b, which are shaft integrated type in which the shaft 104 serving as a shaft bearing is shrink-fitted, is formed such that an aluminum alloy is used as a base material, reflecting surfaces Ra and Rb are formed by ultra-precision cutting, respectively, and transparent protection films are formed on the reflecting surfaces.

Figure 9:
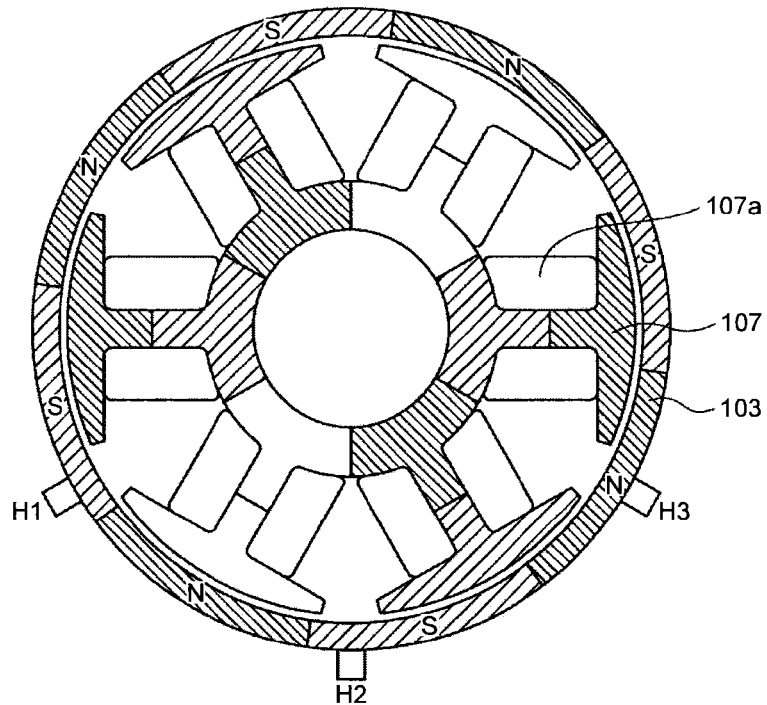
FIG. 9 is a cross-sectional view of a motor section of the optical deflector on a plane perpendicular to a rotation axis.

FIG. 9 is a cross-sectional view of the motor section on a plane perpendicular to the rotation axis of the optical deflector 7, in particular, illustrates a state in which the six coils 107a are concentrically wound on the stator core 107 having six salient poles. The rotor magnet 103 arranged on the outer peripheral portion is an 8-pole 6-slot motor that is magnetized at eight poles in the circumferential direction.

Hall elements H1, H2, and H3 serving as the position detecting elements detect magnetism of N-S poles of the driving magnet and convert the magnetism into electrical signals. The output obtained by magneto-electrical conversion is amplified and subjected to wave shaping, and converted into a square wave that switches between the "L" level and the "H" level in accordance with a magnetization boundary.

Of the position detecting elements, one of the position detecting elements for switching a conducting phase, for example, the position detecting element H1, is used and the wave-shaping signal of the position detecting element is also used to control the speed of the motor. To control the speed, PLL (Phase Locked Loop) control is used. The wave-shaping signal of the Hall element is used as a phase comparison signal with respect to the reference clock signal serving as a target speed signal, and the wave-shaping signal is controlled so as to be accurately synchronized with the reference clock signal.

The driving magnet and the rotary polygon mirror are integrated as the rotator, and the wave-shaping signal of the Hall element has the wavenumber, i.e., four, equal to the number of surfaces of the rotary polygon mirror for each rotation. Therefore, it is possible to specify a rotation angle position of the rotary polygon mirror by the wave-shaping signal of the Hall element.

The motor system may be an 8-pole 12-slot type in the case of eight poles.

The motor system may be a 4-pole 3-slot motor system or a 4-pole 6-slot motor system, in which the wavenumber of the wave-shaping signal of the Hall element becomes two (two periods) per rotation. With the wave-shaping signal of the Hall element whose wavenumber is two, which is a half of the number of surfaces (four) of the rotary polygon mirror, the rotation angle position of the rotary polygon mirror can be specified (see FIG. 5).

In a 2-pole 3-slot motor system whose wavenumber per rotation is one (one period), it is possible to specify the rotation angle position of the rotary polygon mirror by the wave-shaping signal of the Hall element.

In this way, when the number of mirror surfaces of the rotary polygon mirror is N and the number of magnetic poles of the driving magnet of the optical deflector serving as a motor is 2M, and if M is a divisor of N, it is possible to specify the rotation angle position of the rotary polygon mirror (see FIG. 6).

Image Forming Apparatus

An image forming apparatus according to the embodiment of the present invention will be explained below.

Figure 10:
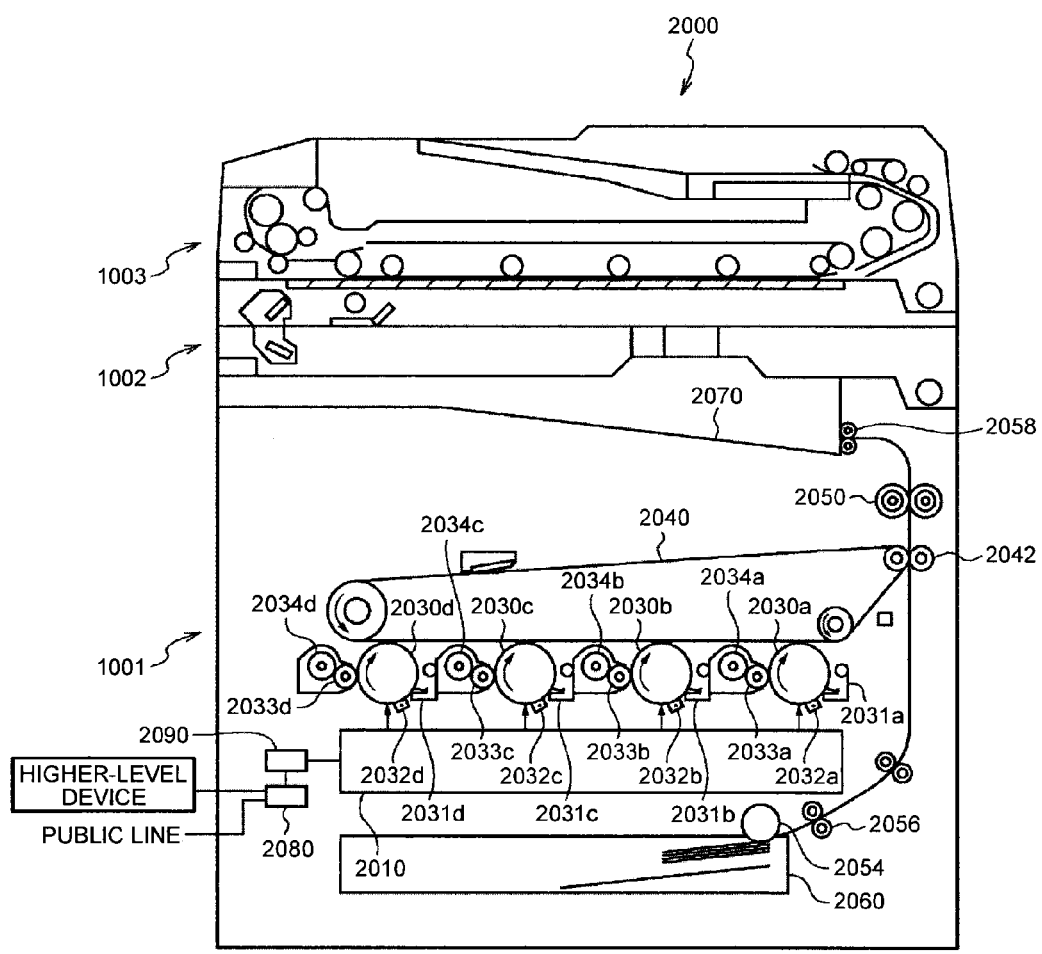
FIG. 10 is a central sectional view of an image forming apparatus according to the embodiment of the present invention.

FIG. 10 is a central sectional view of an image forming apparatus according to the embodiment of the present invention. An image forming apparatus 2000 is a multifunction peripheral (MFP) having functions of a copier, a printer, and a facsimile machine, and includes a main body device 1001, a reading device 1002, an automatic document feeder 1003, and the like.

The main body device 1001 is a multicolor printer of a tandem type that forms a full-color image by superimposing four colors (black, cyan, magenta, and yellow), and includes an optical scanning device 2010, photosensitive drums 2030 (2030a, 2030b, 2030c, 2030d), a transfer belt 2040, a transfer roller 2042, a fixing roller 2050, a sheet feed roller 2054, a registration roller pair 2056, a discharge roller 2058, a sheet feed tray 2060, a discharge tray 2070, a communication control device 2080, and a printer control device 2090.

The communication control device 2080 controls bidirectional communication with a higher-level device, such as a personal computer, via a communication network. The printer control device 2090 integrally controls each of the units included in the image forming apparatus 2000.

The photoconductive photosensitive drums 2030, each of which is formed in a cylindrical shape and on which an electrostatic latent image is formed by exposure by the optical scanning device 2010, are disposed below the transfer belt 2040 in order of the photosensitive drum 2032d for yellow, the photosensitive drum 2030c for magenta, the photosensitive drum 2030b for cyan, and the photosensitive drum 2030a for black from the upstream side in the moving direction of the transfer belt 2040 (counterclockwise in FIG. 10).

The photosensitive drums 2030 in FIG. 10 correspond to the photoreceptors 10 in FIG. 2.

Around the photosensitive drums 2030, processing members, such as charging devices 2032 (2032a, 2032b, 2032c, 2032d), developing rollers 2033 (2033a, 2033b, 2033c, 2033d), toner cartridges 2034 (2034a, 2034b, 2034c, 2034d), and cleaning units 2031 (2031a, 2031b, 2031c, 2031d), based on the electrophotographic method (electrophotographic process) are arranged in the rotation direction of the photosensitive drums, respectively.

As a charging means, a corona charger may be used.

The photosensitive drum 2030a, the charging device 2032a, the developing roller 2033a, the toner cartridge 2034a, and the cleaning unit 2031a are used as a set, and form an image forming station for forming a black (K) image.

The photosensitive drum 2030b, the charging device 2032b, the developing roller 2033b, the toner cartridge 2034b, and the cleaning unit 2031b are used as a set, and form an image forming station for forming a cyan (C) image.

The photosensitive drum 2030c, the charging device 2032c, the developing roller 2033c, the toner cartridge 2034c, and the cleaning unit 2031c are used as a set, and form an image forming station for forming a magenta (M) image.

The photosensitive drum 2030d, the charging device 2032d, the developing roller 2033d, the toner cartridge 2034d, the cleaning unit 2031d are used as a set, and form an image forming station for forming a yellow (Y) image.

The optical scanning device 2010 is an optical writing device that optically writes data or the like to the photosensitive drums 2030, and performs an exposure process of an electrophotographic process. The optical scanning device 2010 apples light beams modulated for a plurality of colors to the charged surfaces of the corresponding photosensitive drums 2030 based on pieces of image information for the respective colors (black image information, cyan image information, magenta image information, and yellow image information) obtained from the higher-level device connected to the communication control device 2080. On the surfaces of the photosensitive drums 2030, the electrical charges in portions irradiated with the light beams are lost, so that electrostatic latent images corresponding to the pieces of the image information are formed. The formed electrostatic latent images are what is called negative latent images, and move toward the corresponding developing rollers 2033 along with rotation of the photosensitive drums 2030.

The toner cartridge 2034a contains black toner, the toner cartridge 2034b contains cyan toner, the toner cartridge 2034c contains magenta toner, and the toner cartridge 2034d contains yellow toner. The toners for the respective colors of the toner cartridges 2034 is supplied to the corresponding developing rollers 2033.

On the surfaces of the developing rollers 2033, toners from the corresponding toner cartridges 2034 are coated thinly and uniformly along with rotation of the developing rollers 2033. The toners coated on the surfaces of the developing rollers 2033 adhere to the electrostatic latent images formed on the surfaces of the photosensitive drums 2030 when coming into contact with the surfaces of the photosensitive drums 2030 for the respective colors, so that the electrostatic latent images are developed and the toner images are formed. The formed toner images move toward the transfer belt 2040 along with rotation of the photosensitive drums 2030.

The toner images for yellow, magenta, cyan, and black are superimposed one on top of the other onto the transfer belt 2040 at a predetermined timing, so that a color image is formed.

The sheet feed tray 2060 houses sheets of paper serving as recording media. Near the sheet feed tray 2060, the sheet feed roller 2054 is arranged. The topmost sheet among the sheets of paper housed in the sheet feed tray 2060 is fed to the sheet feed roller 2054, and the leading end of the fed sheet of paper is caught by the registration roller pair 2056. The registration roller pair 2056 feeds the sheet of paper toward a nip between the transfer belt 2040 and the transfer roller 2042 in synchronization with the timing at which the toner images on the photosensitive drums 2030 are moved to the transfer positions. The color image on the transfer belt 2040 is transferred onto the fed sheet of paper. The sheet of paper on which the color image is transferred is conveyed to the fixing roller 2050.

Heat and pressure are applied to the sheet of paper conveyed to the fixing roller 2050, so that the toner is fixed to the sheet of paper. The sheet of paper with the fixed toner is conveyed to the discharge tray 2070 via the discharge roller 2058, and stacked on the discharge tray 2070 in sequence.

The cleaning units 2031 remove toner (residual toner) remaining on the surfaces of the photosensitive drums 2030 after the toner images are transferred. The surfaces of the photosensitive drums 2030 from which the residual toner is removed are returned to the positions opposite the corresponding charging devices 2032.

By applying the optical scanning device according to the embodiment of the present invention explained above to the optical scanning device 2010, even when there is a small position detection error of the rotation position detection signal of the deflecting scanning means, it is possible to prevent unnecessary exposure near the end of the scanning optical system opposite the synchronous detection section. Furthermore, it is possible to maximize a writable angular range, as an effective scanning range, and prevent an increase in the optical path length.

According to an embodiment of the present invention, in a system in which a light beam emitted by one light source is divided into two or more light beams and the light beams are applied to opposing scanning optical systems to perform writing in a time-shared manner, even when there is a small position detection error of the rotation position detection signal of the deflecting scanning means, it is possible to prevent unnecessary exposure near the end of a scanning optical system opposite a synchronous detection section.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a light source;
   a light dividing unit configured to divide a light beam emitted by the light source into light beams;
   a polygonal-mirror optical deflector configured to deflect each of the light beams divided by the light dividing unit; and
   a plurality of scanning optical systems configured to focus the respective light beams deflected by the polygonal-mirror optical deflector onto corresponding scanning surfaces, wherein
   the scanning optical systems include a first scanning optical system and a second scanning optical system,
   the first scanning optical system and the second scanning optical system are disposed respectively at each side of a plane including a rotation axis of the polygonal-mirror optical deflector,
   each of the first scanning optical system and the second scanning optical system includes a synchronous detection optical system that determines a timing to start scanning the scanning surfaces with the light beams, and
   wherein Ta>Tb is satisfied, where Ta is a time from an end of an effective scanning area in the second scanning optical system to synchronous detection in the first scanning optical system and Tb is time from an end of an effective scanning area in the first scanning optical system to synchronous detection in the second scanning optical system, and
   wherein the synchronous detection optical system of the first scanning optical system is located rotationwise between the end of the effective scanning area in the second scanning optical system and a start of the effective scanning area in the first scanning optical system, and the synchronous detection optical system of the second scanning optical system is located rotationwise between the end of the effective scanning area in the first scanning optical system and a start of the effective scanning area in the second scanning optical system.

2. The optical scanning device according to claim 1, wherein
   the polygonal-mirror optical deflector outputs a rotation position detection signal whose wavenumber per rotation is equal to a divisor of the number of surfaces of the polygonal mirror, and
   first lighting of the light source is performed in a period corresponding to Ta based on the rotation position detection signal.

3. The optical scanning device according to claim 1, wherein
the first scanning optical system is closer to the light source than the second scanning optical system in terms of an angle measured in a rotational direction around the axis of the optical deflector from the light source.

4. The optical scanning device according to claim 1, wherein
an optical surface of a scanning lens of each of the scanning optical systems has an asymmetric shape in the main-scanning direction with respect to a center of an outer shape in the main-scanning direction.

5. The optical scanning device according to claim 1, wherein
each of the synchronous detection optical systems includes a synchronous section through which a light beam for synchronization passes, and
the scanning lens is formed such that the synchronous section and a scanning section through which a light beam for scanning passes are integrated with each other.

6. The optical scanning device according to claim 5, wherein
the synchronous section includes two sections formed on both ends of the scanning lens in the main-scanning direction and has no power in the main-scanning direction, and
lengths of the two sections formed on the both ends in the main-scanning direction are different from each other.

7. The optical scanning device according to claim 5, wherein a curvature of the synchronous section in the sub-scanning direction and a curvature of the scanning section in the sub-scanning direction are different from each other.

8. The optical scanning device according to claim 1, wherein
the synchronous detection optical systems are arranged such that T1<T2 is satisfied, where T1 is a time from synchronous detection by the first scanning optical system to synchronous detection in the second scanning optical system and T2 is a time from synchronous detection by the second scanning optical system to synchronous detection in the first scanning optical system.

9. The optical scanning device according to claim 1, wherein
light intensity of the light source is controlled in a period from an end of an effective scanning area in the second scanning optical system to synchronous detection of the first scanning optical system.

10. An image forming apparatus configured to separately form electrostatic latent images on surfaces of a plurality of photoreceptors by optical scanning, develops the electrostatic latent images to form toner images, and transfers all of the toner images on a single recording medium to synthetically form an image, the image forming apparatus comprising:
the optical scanning device according to claim 1 configured to form the electrostatic latent images, wherein
the first scanning optical system of the optical scanning device is used for black, and
the second scanning optical system of the optical scanning device is used for a color other than black.

11. An optical scanning device comprising:
a light source;
a light dividing unit configured to divide a light beam emitted by the light source into light beams;
a polygonal-mirror optical deflector configured to deflect each of the light beams divided by the light dividing unit; and
a plurality of scanning optical systems configured to focus the respective light beams deflected by the polygonal-mirror optical deflector onto corresponding scanning surfaces, wherein
the scanning optical systems include a first scanning optical system and a second scanning optical system,
the first scanning optical system and the second scanning optical system are disposed respectively at each side of a plane including a rotation axis of the polygonal-mirror optical deflector,
each of the first scanning optical system and the second scanning optical system includes a synchronous detection optical system that determines a timing to start scanning the scanning surfaces with the light beams, and
Ta>Tb is satisfied, where Ta is a time from an end of an effective scanning area in the second scanning optical system to synchronous detection in the first scanning optical system and Tb is time from an end of an effective scanning area in the first scanning optical system to synchronous detection in the second scanning optical system,
wherein the first scanning optical system is closer to the light source than the second scanning optical system in terms of an angle measured in a rotational direction around the axis of the optical deflector from the light source, a reference axis determining the light source side and an opposite side of the light source side, the reference axis being perpendicular to the rotation axis of the polygonal-mirror optical deflector, and parallel to optical axes of the first scanning optical system and the second scanning optical system, and
in the first scanning optical system, an angle measured with respect to the reference axis and corresponding to an effective scanning area on the light source side is smaller than an angle with respect to the reference axis and corresponding to an effective scanning area on the opposite side of the light source.

* * * * *